United States Patent
Tanaka et al.

(10) Patent No.: US 12,308,168 B2
(45) Date of Patent: May 20, 2025

(54) SEPARATOR FOR ELECTROCHEMICAL ELEMENTS, AND ELECTROCHEMICAL ELEMENT

(71) Applicant: NIPPON KODOSHI CORPORATION, Kochi (JP)

(72) Inventors: Kosuke Tanaka, Kochi (JP); Atsushi Igawa, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 197 days.

(21) Appl. No.: 17/909,928

(22) PCT Filed: Jan. 20, 2021

(86) PCT No.: PCT/JP2021/001851
§ 371 (c)(1),
(2) Date: Sep. 7, 2022

(87) PCT Pub. No.: WO2021/186883
PCT Pub. Date: Sep. 23, 2021

(65) Prior Publication Data
US 2024/0203668 A1  Jun. 20, 2024

(30) Foreign Application Priority Data

Mar. 16, 2020 (JP) ................ 2020-045735

(51) Int. Cl.
| | | |
|---|---|---|
| *H01G 11/52* | (2013.01) | |
| *H01G 9/02* | (2006.01) | |
| *H01M 10/0525* | (2010.01) | |
| *H01M 50/429* | (2021.01) | |
| *H01M 50/44* | (2021.01) | |
| *H01M 50/494* | (2021.01) | |

(52) U.S. Cl.
CPC .............. *H01G 11/52* (2013.01); *H01G 9/02* (2013.01); *H01M 10/0525* (2013.01); *H01M 50/4295* (2021.01); *H01M 50/44* (2021.01); *H01M 50/494* (2021.01)

(58) Field of Classification Search
CPC ..... H01G 9/02; H01G 11/52; H01M 50/4295; H01M 50/44; H01M 50/494
See application file for complete search history.

(56) References Cited

U.S. PATENT DOCUMENTS

| | | |
|---|---|---|
| 2013/0183569 A1 | 7/2013 | Hayakawa et al. |
| 2016/0293338 A1 | 10/2016 | Tanaka et al. |
| 2018/0047961 A1 | 2/2018 | Igawa et al. |
| 2018/0274174 A1 | 9/2018 | Tanaka et al. |
| 2018/0287119 A1 | 10/2018 | Igawa et al. |
| 2018/0315551 A1 | 11/2018 | Igawa et al. |

FOREIGN PATENT DOCUMENTS

| | | |
|---|---|---|
| JP | H05-267103 A | 10/1993 |
| JP | H09-45586 A | 2/1997 |
| JP | 2006-253728 A | 9/2006 |
| JP | 2008-274525 A | 11/2008 |
| JP | 2012-221566 A | 11/2012 |
| JP | 2015-088703 A | 5/2015 |
| JP | 2016-134425 A | 7/2016 |
| JP | 2016-171166 A | 9/2016 |
| JP | 2017-069229 A | 4/2017 |
| JP | 2018-073856 A | 5/2018 |
| WO | 2017/047699 A1 | 3/2017 |

OTHER PUBLICATIONS

Apr. 13, 2021 International Search Report issued in International Patent Application No. PCT/JP2021/001851.
Oct. 17, 2024 Extended European Search Report issued in European Patent Application No. 21770768.6.

*Primary Examiner* — Sarah A. Slifka
(74) *Attorney, Agent, or Firm* — Oliff PLC

(57) ABSTRACT

A separator for electrochemical elements is formed of beaten regenerated cellulose fibers and capable of withstanding a common element winding process for an aluminum electrolytic capacitor, while having denseness and low impedance characteristics. The separator is interposed between a pair of electrodes, while capable of holding an electrolyte solution that contains an electrolyte, is configured from a single layer so as to have a thickness of 10 to 35 μm, a density of 0.35 to 0.80 g/cm$^3$, a tensile strength of 9.8 N/15 mm or more, an average pore diameter of 0.05 to 1.00 μm, and a modified tensile strength of 5.9 N/15 mm or more, if the value of a tensile strength as measured by setting the distance between holders of a tensile testing machine to 0.1 mm and the elongation rate of a test piece to 200 mm/min is defined as the modified tensile strength.

6 Claims, No Drawings

SEPARATOR FOR ELECTROCHEMICAL ELEMENTS, AND ELECTROCHEMICAL ELEMENT

TECHNICAL FIELD

The present invention relates to a separator for electrochemical elements, and an electrochemical element using the separator for an electrochemical element.

BACKGROUND ART

Examples of electrochemical elements include aluminum electrolytic capacitors, electric double-layer capacitors, lithium-ion capacitors, lithium-ion secondary batteries, and lithium primary batteries.

Main roles of a separator in an electrochemical element including isolating both electrodes from each other and holding an electrolyte solution. To isolate both sheets of electrode foil, the separator is required to provide high shielding properties and low resistance in a compatible manner. The material of the separator is required to have electrical insulation. To hold various types of electrolyte solution, the material is required to have hydrophilicity and lipophilicity.

Cellulose has these characteristics concurrently. Cellulose paper has long been used as a separator for electrochemical elements. Among cellulose fibers, beatable regenerated cellulose fibers are characterized by generating fibrils having high stiffness and a small fiber diameter when highly beaten. It is known that the use of beaten regenerated cellulose fibers can produce a microporous, highly dense separator. Therefore, in recent years, separators using beatable regenerated cellulose fibers have often been reported. (See, for example, Patent Literature 1 to Patent Literature 8.)

CITATION LIST

Patent Literature

Patent Literature 1: JP H05-267103 A
Patent Literature 2: JP H09-45586 A
Patent Literature 3: WO 2017/047699 A
Patent Literature 4: JP 2012-221566 A
Patent Literature 5: JP 2018-073856 A
Patent Literature 6: JP 2006-253728 A
Patent Literature 7: JP 2016-134425 A
Patent Literature 8: JP 2017-69229 A

SUMMARY OF INVENTION

Technical Problem

Patent Literature 1 proposes a method in which beatable regenerated cellulose fibers are used in order to improve the denseness and the impedance characteristics of a separator. The paper quality of the separator using the beaten regenerated cellulose fibers is highly dense, microporous paper. In aluminum electrolytic capacitors produced by using this separator, the percentage of defective products due to short circuits decreases, and the impedance characteristics are improved.

By increasing the degree of beating of the beatable regenerated cellulose fibers, fine fibrils having a fiber diameter of less than 3 μm can be obtained. Due to having high stiffness and being less likely to be flatten, the obtained fibrils are not bound in a film shape like the fibrils of natural cellulose fibers when made into paper. Therefore, by using the beaten regenerated cellulose fibers for the separator, a separator having extremely high denseness can be obtained. An infinite number of independent fibrils point-bonded by hydrogen bonds form such a separator. Although the separator thus obtained has high denseness, the separator has microporous paper quality due to the structure of the separator. In addition, main fibers remaining without being beaten and the fibrils having a fiber diameter of less than 3 μm do not inhibit the flow of ions in the electrolyte solution, unlike the relatively flat natural cellulose fibers. This is because the cross sections of these unbeaten main fibers and fibrils each have a cross section close to a perfect circle.

From the above reasons, separators formed of regenerated cellulose fibers are excellent in short-circuit resistance and impedance characteristics. Therefore, the use of such separators has been rapidly increased particularly in aluminum electrolytic capacitors for in-vehicle applications, which strongly requires to have both denseness and low impedance characteristics. Furthermore, a thin separator having a thickness of 35 μm or less has increasingly been used for the purpose of miniaturization or achieving high capacity. When used as the separator for aluminum electrolytic capacitors, a separator formed of regenerated cellulose fibers is used after slitting to about 2 mm in the case of a thin separator.

Here, in the process of manufacturing the aluminum electrolytic capacitor, the electrode foil and the separator are alternately laminated, cut and wound with a desired length, and then fastened with a tape or the like to produce an element. The process of cutting and taping of the separator and the like repeats the cycle in which the winding machine is temporarily stopped, cutting and taping are performed, and then the winding machine is actuated again to wind the next element.

Therefore, when the winding machine is re-actuated to wind the next element, tension is suddenly applied to the separator set in the winding machine. A separator formed of regenerated cellulose fibers has a small tensile strength. Thus, particularly when the thickness is 35 μm or less, there is a problem that breakage of the separator is likely to occur in the process of manufacturing an aluminum electrolytic capacitor. To avoid this problem, when a separator formed of regenerated cellulose fibers is used, an element of an aluminum electrolytic capacitor may be produced by using an element winding machine subjected to a treatment for reducing a load applied to the separator and also reducing a winding speed.

In addition, the separator is temporarily pressed near the end on the side far from the winding core by using a jig, then cut to a desired length, and pulled out from the temporary pressing portion at the time of winding. In this situation, even if the pressure of the temporary pressing is set to the minimum required for winding, the separator may be broken at the time of pulling out. Furthermore, since the strength is small, the separator has a low resistance to a portion to which stress is applied, such as a tab portion or a foil burr of an aluminum electrolytic capacitor, and may be broken to cause a short circuit.

In the case of a separator formed of natural cellulose fibers, since the cross sections of the main fibers and the fibril portions are relatively flat and have low stiffness, the contact area is wide and the bond strength between the fibers is large. Therefore, by setting the tensile strength to 9.8 N/15 mm or more in general, breakage of the separator hardly occurs without modifying the element winding machine for the aluminum electrolytic capacitor to reduce the load applied to the separator.

However, in the separator formed of regenerated cellulose fibers, the cross sections of the main fibers having a fiber diameter of 3 μm or more and the fibril portions having a fiber diameter of less than 3 μm are close to a perfect circle and have high stiffness. Thus, the area of the contact point is small and the bonding strength between the fibers is small. Therefore, even when the tensile strength is 9.8 N/15 mm or more, the separator cannot withstand a rapid tension change and may be broken.

Patent Literature 1 also proposes that abaca pulp, sisal hemp pulp, or the like is blended with beatable regenerated cellulose fibers.

Patent Literature 2 proposes a separator for electric double-layer capacitors, which is formed of sisal hemp pulp and solvent spun rayon that is beatable regenerated cellulose fibers.

When abaca pulp or sisal hemp pulp is blended with the beatable regenerated cellulose fibers, the tensile strength and tear strength are improved. However, the abaca pulp or sisal hemp pulp being hardly beaten and having a high Canadian standard freeness (CSF) value has a long fiber length, and thus there is a problem that the formation of the separator deteriorates. This is because, as the fiber length is longer, it becomes more difficult to uniformly disperse fibers in water, and it becomes difficult to form a uniform paper sheet at the time of papermaking. In order to improve the formation, it is necessary to shorten the fiber length by beating the abaca pulp or the sisal hemp pulp, but beating the abaca pulp or the sisal hemp pulp greatly deteriorate the impedance characteristics.

Patent Literature 3 proposes a separator for electrochemical elements, which is formed from natural cellulose fibers A, natural cellulose fibers B, and regenerated cellulose fibers. In this separator, tensile strength and short-circuit resistance are improved while maintaining denseness and impedance characteristics similar to those of a separator formed of highly beaten regenerated cellulose fibers. However, since natural cellulose fibers are larger in fiber diameter than fibrils of regenerated cellulose fibers, deterioration of denseness and impedance characteristics cannot be avoided. In particular, when both denseness and low impedance characteristics are strongly required as in an aluminum electrolytic capacitor for in-vehicle applications with a thickness of 35 μm or less, it is difficult to use natural cellulose fibers.

Patent Literature 4 proposes a separator for electrochemical elements, which is formed of cellulose fibers, has excellent strength when an electrolyte solution is attached, and obtained by defining the freeness, the length-weighted average fiber length, and the pattern of the fiber length distribution histogram of solvent spun cellulose fibers.

Patent Literature 5 proposes a separator for aluminum electrolytic capacitors, which is formed of regenerated cellulose fibers and manufactured by a cylinder multilayer paper machine.

The separators of Patent Literature 4 and Patent Literature 5 are produced by a cylinder paper machine. The separators produced by a cylinder paper machine have excellent strength characteristics, but pinholes caused by the wire pattern of a cylinder during papermaking are more likely to occur as the thickness of the separator decreases. In addition, since the cylinder paper machine needs to form a paper sheet by dehydration in a short time due to the structure of the cylinder paper machine, a highly beaten raw material cannot be used. Therefore, the cylinder paper machine is unsuitable for producing a highly dense separator in the small thickness range of 35 μm or less.

Patent Literature 6 proposes a separator in which the tensile strength is improved while also having low impedance by papermaking using beaten regenerated cellulose fibers as a raw material, impregnating and applying the obtained sheet with a paper strength additive.

However, Patent Literature 6 relates to a technique of making a low-density paper, which is hardly beaten, by a cylinder paper machine. This technique is unsuitable for producing a separator having a thickness of 35 μm or less and high denseness.

Patent Literature 7 proposes a separator formed of beaten regenerated cellulose fibers and in which the CSF value and the tear index are controlled. The separator of Patent Literature 7 has a tear strength greater than that of the separators of Patent Literature 1 and Patent Literature 2. Thus, even if the separator has torsion or the like when tension is applied to the separator in the process of manufacturing the aluminum electrolytic capacitor, it can be expected to suppress breakage.

However, the separator of Patent Literature 7 has almost no difference in tensile strength and resistance to a rapid tension change from the separators of Patent Literature 1 and Patent Literature 2. For this reason, in the separator of Patent Literature 7, the treatment for reducing the load of the element winding machine for the aluminum electrolytic capacitor applied to the separator is not unnecessary. In addition, the breakage of the separator when the separator is pulled out from the jig that temporarily presses the separator in producing the element of the aluminum electrolytic capacitor could not be completely solved.

Patent Literature 8 proposes a thin and low-resistance separator for electrochemical elements formed of regenerated cellulose fibers having an average fiber length of from 0.25 to 0.80 mm, an average fiber width of from 3 to 35 μm, and a value of from 15 to 70, which is calculated by dividing the average fiber length by the average fiber width, and having excellent strength and shielding properties.

By setting the balance between the fine fibrils generated on the fiber surface layer and the fiber length within the range of Patent Literature 8, both denseness and low impedance characteristics can be concurrently achieved. However, strength enough to withstand a rapid tension change in an element winding process for an aluminum electrolytic capacitor cannot be achieved, and thus further resistance to breakage has been required.

As described above, even when the separator formed of regenerated cellulose fibers and having a thickness of 35 μm or less has a tensile strength of 9.8 N/15 mm or more, the separator is easily broken in the process of producing the element of the aluminum electrolytic capacitor. Blending natural cellulose fibers deteriorates denseness and impedance characteristics. In addition, the separator produced by the cylinder paper machine has excellent strength characteristics, but the denseness decreases. Therefore, there is a demand for a separator formed of regenerated cellulose fibers, having a thickness of 35 μm or less, having both denseness and low impedance characteristics, and having strength enough to withstand an element winding process for an aluminum electrolytic capacitor.

The present invention has been made in view of the above problems, and an object of the present invention is to provide a separator for electrochemical elements, which is formed of beaten regenerated cellulose fibers, has a thickness of 35 μm or less, has both denseness and low impedance characteristics, and can withstand a general element winding process for an aluminum electrolytic capacitor.

Another object of the present invention is to provide an electrochemical element in which productivity is improved and the percentage of defective products due to short circuits is improved by using the separator for electrochemical elements.

Solution to Problem

A separator for electrochemical elements according to the present invention is interposed between a pair of electrodes, is formed of regenerated cellulose fibers that are beaten, and is configured to hold an electrolyte solution containing an electrolyte.

The separator for electrochemical elements according to the present invention is a single-layer separator, has a thickness of from 10 to 35 μm, a density of from 0.35 to 0.80 g/cm$^3$, a tensile strength of 9.8 N/15 mm or more, and an average pore diameter of from 0.05 to 1.00 μm. When a value of a tensile strength as measured by setting a distance between holders of a tensile testing machine to 0.1 mm and an elongation rate of a test piece to 200 mm/min is defined as a modified tensile strength, the separator has the modified tensile strength of 5.9 N/15 mm or more.

In the above-described separator for electrochemical elements according to the present invention, the regenerated cellulose fibers that are beaten preferably include fibril portions having a fiber diameter of less than 3 μm, and main fibers having a fiber diameter of 3 μm or more, and an average fiber diameter of the main fibers is preferably from 3 to 12 μm.

An electrochemical element according to the present invention includes the above-described separator for electrochemical elements according to the present invention.

The above-described electrochemical element according to the present invention is preferably any of an aluminum electrolytic capacitor, an electric double-layer capacitor, a lithium-ion capacitor, a lithium-ion secondary battery, and a lithium primary battery.

Advantageous Effects of Invention

According to the present invention, it is possible to provide a separator for electrochemical elements, which is formed of beaten regenerated cellulose fibers, and has a thickness of 35 μm or less, the separator having both denseness and low impedance characteristics, and capable of withstanding a general element winding process for an aluminum electrolytic capacitor. In addition, by using this separator, it is possible to provide an electrochemical element in which productivity is improved and the percentage of defective products due to short circuits is improved.

DESCRIPTION OF EMBODIMENTS

Hereinafter, embodiments of the invention according to the present invention will be described in detail.

The separator for electrochemical elements according to the present invention is interposed between a pair of electrodes, is formed of beaten regenerated cellulose fibers, and is capable of holding an electrolyte solution containing an electrolyte.

The separator for electrochemical elements according to the present invention is a single-layer separator, and has a thickness of from 10 to 35 μm, a density of from 0.35 to 0.80 g/cm$^3$, a tensile strength of 9.8 N/15 mm or more, and an average pore diameter of from 0.05 to 1.00 μm.

In addition, in the separator for electrochemical elements according to the present invention, when a value of tensile strength measured by setting a distance between holders of a tensile testing machine to 0.1 mm and an elongation rate of a test piece to 200 mm/min is defined as a modified tensile strength, the modified tensile strength is 5.9 N/15 mm or more.

The inventors of the present invention conducted test studies on various materials and manufacturing methods in addition to the examples provided in the embodiments and examples described later.

As a result, the test studies led to a conception of setting a modified tensile strength of 5.9 N/15 mm or more in a separator for electrochemical elements, which is formed of beaten regenerated cellulose fibers, is a single-layer separator, and has a thickness of from 10 to 35 μm, a density of from 0.35 to 0.80 g/cm$^3$, a tensile strength of from 9.8 N/15 mm or more and an average pore diameter of from 0.05 to 1.00 μm.

Furthermore, it was found that 5.9 N/15 mm or more of the modified tensile strength makes it possible to provide a separator for electrochemical elements, which has both denseness and low impedance characteristics and can withstand the element winding process for an aluminum electrolytic capacitor.

The "modified tensile strength" in the present invention is a value of tensile strength measured by setting a distance between holders of a tensile testing machine to 0.1 mm and an elongation rate of a test piece to 200 mm/min.

When the distance between the holders of the tensile testing machine is set to 0 mm, the holders are in contact with each other, the load at the zero point of the tensile testing machine becomes unstable, and thus it is difficult to obtain an accurate measurement value. Therefore, the distance between the holders was set to 0.1 mm as a setting of a tensile testing machine, in which the distance between the holders is the narrowest and measurement is possible.

The separator for aluminum electrolytic capacitors is generally required to have a tensile strength of 9.8 N/15 mm or more as a strength enough to withstand the element winding process. When the tensile strength is less than 9.8 N/15 mm, breakage of the separator is likely to occur in the element winding process for the aluminum electrolytic capacitor regardless of whether the separator is a natural cellulose-based separator or a separator formed of regenerated cellulose fibers. However, even when the tensile strength is 9.8 N/15 mm or more, the natural cellulose-based separator is not broken in the element winding process for the aluminum electrolytic capacitor, and the separator formed of regenerated cellulose fibers may be broken. The difference therebetween is the resistance to rapid tension changes. In the present invention, a value of modified tensile strength is employed as an index of the resistance thereto.

When the modified tensile strength is less than 5.9 N/15 mm, the separator formed of regenerated cellulose fibers is easily broken in the element winding process for the aluminum electrolytic capacitor even when the tensile strength is 9.8 N/15 mm or more.

The measurement of the tensile strength is usually performed at a distance between the holders of 180 mm and an elongation rate of a test piece of 20 mm/min. Since a load applied to the separator is absorbed to some extent by elongation of the separator at the time of measurement, a sudden tension is not applied to the separator, and the separator can withstand even a relatively strong load.

On the other hand, in the modified tensile strength, since there is almost no distance between the holders, the separator cannot be stretched and receives a sudden tension, and is broken with a relatively weak load. Therefore, the modified tensile strength is suitable as an index for evaluating resistance to a rapid tension change.

Examples of the regenerated cellulose fiber that can be used for the separator for electrochemical elements according to the present invention include solvent spun rayon typified by Lyocell, and polynosic rayon. However, the present invention is not limited to these examples, and any beatable regenerated cellulose fiber can be used.

As the regenerated cellulose fiber before beating, any fiber diameter can be employed. However, too large fiber diameter before beating is likely to cause poor fluidity during beating and defects such as clogging. Since too small fiber diameter before beating reduces the amount of fibrils generated by beating, it becomes difficult to ensure denseness. Therefore, the fiber diameter before beating is preferably from 4 to 18 µm.

Preferably, the beaten regenerated cellulose fibers include fibril portions having a fiber diameter of less than 3 µm and main fibers having a fiber diameter of 3 µm or more, and the average fiber diameter of the main fibers is from 3 to 12 µm. The average fiber diameter of the main fibers can be controlled by beating regenerated cellulose fibers having a fiber diameter before beating of from 4 to 18 µm. The surface area of the fibers constituting the separator can be increased by making the average fiber diameter of the main fibers as thin as possible in the range of from 3 to 12 µm. Thus, the bonding area between the fibers increases, and the modified tensile strength of the separator is improved.

However, when the difference between the fiber diameter of the regenerated cellulose fibers before beating and the average fiber diameter of the main fibers having a fiber diameter of 3 µm or more in the separator is small, even when the average fiber diameter of the main fibers is in the range of from 3 to 12 µm, generation of fibrils by beating is insufficient, and the denseness of the separator is insufficient. Thus, the average pore diameter is greater than 1.00 µm. By beating the regenerated cellulose fibers to such an extent that the average pore diameter of the separator is 1.00 µm or less, 5.9 N/15 mm or more of the modified tensile strength of the separator can be ensured.

When the regenerated cellulose fibers are beaten until no main fiber having a fiber diameter of 3 µm or more is left, and the regenerated cellulose fibers become those constituted only by fibril portions each having a fiber diameter of less than 3 µm, the strength of the fiber itself significantly decreases. Thus, the modified tensile strength decreases. In addition, when the regenerated cellulose fibers become those constituted only by the fibril portions, the fibers are too fine, so that the amount of fibers flowing out of the system together with water from the papermaking wire increases. Thus, it is not suitable as a raw material for papermaking.

On the other hand, as the average fiber diameter increases, the number of overlapping main fibers in the separator decreases. Thus, when the average fiber diameter is larger than 12 µm, it is difficult to produce a dense separator having a thickness of 35 µm or less as well as the modified tensile strength is small.

The facility used for beating the regenerated cellulose fibers used in the present invention may be any facility as long as it is used for preparation of a normal papermaking raw material. In general, a beater, a conical refiner, a disc refiner, a high-pressure homogenizer, and the like can be exemplified.

The separator for electrochemical elements according to the present invention is preferably a separator having only single Fourdrinier layer that is one layer formed by papermaking using a Fourdrinier paper machine.

When a paper machine of a type of performing drainage and forming a paper sheet in a short time, such as a cylinder paper machine, a tanmo paper machine, or a former, is used, fibers are deposited at an opening portion of a papermaking wire, but fibers are hardly deposited at a wired portion. A portion where fibers are not deposited is called a pinhole, and is likely to cause a short circuit of an electrochemical element.

On the other hand, in a Fourdrinier paper machine, since slow dehydration is performed using a long papermaking wire, fibers are deposited also in a wired portion of the papermaking wire. Thus, a dense paper sheet free of pinholes can be formed.

In the separator for electrochemical elements according to the present invention, it is preferable that a dry paper strength additive is added to a papermaking raw material at the time of papermaking, or a dry paper strength additive is applied to the separator after papermaking. In addition, additives usually used in the papermaking process, for example, a dispersant, an anti-foaming agent, and the like may be used, if needed. The dry paper strength additive has an action of enhancing the bonding of fiber contact points by increasing the number of hydrogen bonds between cellulose fibers, and thus has an effect of enhancing the paper strength during drying. Therefore, the modified tensile strength can be improved by using the dry paper strength additive.

Since the separator for electrochemical elements according to the present invention is formed of regenerated cellulose fibers in which many fibrils having a fiber diameter of less than 3 µm are generated by beating, the surface area is large, and in particular, the paper strength enhancing effect of the dry paper strength additive is easily exhibited.

The dry paper strength additive can be appropriately used as long as the content of the ionic impurities is not more than a level at which the electrode foil of the aluminum electrolytic capacitor is not corroded.

The generally known dry paper strength additive include synthetic polymer compounds such as polyacrylamide-based resins or polyvinyl alcohol-based resins, and natural polymer compounds such as cationized starch, amphoteric starch, vegetable gum, or carboxymethyl cellulose. From the viewpoint of ease of reducing the content of ionic impurities and ease of handling, polyacrylamide-based resins are preferably used.

The separator for electrochemical elements according to the present invention has a thickness of from 10 to 35 µm and a density of from 0.35 to 0.80 g/cm$^3$. In order to control the thickness and density, calendering may be performed, if needed.

Less than 10 µm of the thickness decreases the mechanical strength and facilitates breakage of the separator in the processes of manufacturing the separator and the electrochemical element. In addition, since the distance between the electrodes is small, short-circuit resistance cannot be ensured. In the separator according to the present invention, it is difficult to lower the density to less than 0.35 g/cm$^3$ because the fibers are refined and a dense paper sheet is formed.

On the other hand, higher than 0.80 g/cm$^3$ of the density decreases the number of pores in the separator, inhibits the ion permeability, and rapidly decreases the impedance characteristics.

The average pore diameter of the separator for electrochemical elements according to the present invention is from 0.05 to 1.00 µm.

The value of 0.05 µm is a lower limit value of measurement of the device used for the measurement. The separator in which the average pore diameter cannot be measured, that is, the average pore diameter is equal to or less than the lower limit value of measurement has poor ion permeability and poor impedance characteristics. When the average pore diameter is more than 1.00 µm, the denseness of the separator is insufficient, so that short-circuiting of the electrochemical element is likely to occur.

The electrochemical element according to the present invention can be produced using the separator for electrochemical elements according to the present invention. Preferably, the electrochemical element according to the present invention is any of an aluminum electrolytic capacitor, an electric double-layer capacitor, a lithium-ion capacitor, a lithium-ion secondary battery, and a lithium primary battery.

EXAMPLES

Hereinafter, specific examples according to the present invention, comparative examples, and conventional examples will be described.
(Evaluation Method)

In examples, comparative examples, and conventional examples, specific measurement of each characteristic of a papermaking raw material, a separator, an aluminum electrolytic capacitor, and a wound electric double-layer capacitor was performed under the following conditions and methods.
[Thickness]

The thickness of the separator was measured using a method defined in "JIS C 2300-2 'Cellulosic papers for electrical purposes-Part 2: Methods of test', 5.1 Thickness", in which the separator was folded in 10 sheets as in "5.1.3 Case where paper is folded and the thickness of the folded paper is measured" using a micrometer in "5.1.1 Measurement instrument and measurement method, a. Case of using micrometer for external measurement".
[Density]

The density of the separator in a bone dry condition was measured using the method defined in the B method of "JIS C 2300-2 'Cellulosic papers for electrical purposes-Part 2: Methods of test', 7.0A Density".
[Tensile Strength]

The tensile strength of the separator in the longitudinal direction was measured using the method defined in "JIS C 2300-2 'Cellulosic papers for electrical purposes-Part 2: Methods of test', 8. Tensile strength and elongation".
[Modified Tensile Strength]

The modified tensile strength of the separator in the longitudinal direction was measured using the method defined in "JIS C 2300-2 'Cellulosic papers for electrical purposes-Part 2: Methods of test', 8. Tensile strength and elongation" except that the distance between the holders of the tensile testing machine was set to 0.1 mm and the elongation rate of the test piece to 200 mm/min.
[Average Pore Diameter]

In the measurement of the average pore diameter, the average pore diameter (µm) was determined from a pore diameter distribution measured using a bubble point method (ASTMF316-86, JIS K 3832) using Parm-Porometer manufactured by PMI. For the measurement of the average pore diameter, GALWICK (manufactured by Porous Materials, Inc.) was used as a test liquid. The lower limit value of measurement of the average pore diameter of Parm-Porometer is 0.05 µm.

[Average Fiber Diameter of Main Fibers of 3 µm or More]

The surface of the separator was observed by using a scanning electron microscope at a magnification of 1000 times, the widths of 200 different main fibers having a fiber diameter of 3 µm or more were measured, and the average value thereof was determined.
[Method for Producing Aluminum Electrolytic Capacitor]

Anodic aluminum foil and cathodic aluminum foil, which were subjected to an etching treatment and an oxide film formation treatment, were wound with a separator interposed therebetween so that the anodic aluminum foil and the cathodic aluminum foil did not come into contact with each other to produce a capacitor element. The capacitor element was impregnated with a predetermined electrolyte solution and put in a case, and then the case was sealed to produce an aluminum electrolytic capacitor having a diameter of 10 mm, a height of 10 mm, and a rated voltage of 35 V or 160 V. The length of the anodic aluminum foil at the time of producing the capacitor element was made constant.
[Workability During Production of Aluminum Electrolytic Capacitor Element]

When 100 capacitor elements were produced, the number of occurrences of separator breakage was measured under the same production conditions, and the capacitor element whose number of occurrences was 1 or less was evaluated as ○, the capacitor element whose number of occurrences was 9 or less was evaluated as Δ, and the capacitor element whose number of occurrences was 10 or more was evaluated as X.
[Percent Defective after Aging of Aluminum Electrolytic Capacitor]

For each of 100 capacitor samples, aging was performed such that the voltage was gradually raised to about 110% of the rated voltage. The percent defective was defined as the percent obtained by dividing the number of capacitors in which a defect occurred, including abnormal appearances such as aging short circuit, actuation of an explosion-proof valve, fluid leakage, and swelling of a sealing portion, by 100.
[Impedance of Aluminum Electrolytic Capacitor]

The impedance of the aluminum electrolytic capacitor was measured at 20° C. and a frequency of 100 kHz using an LCR meter.
[Method for Producing Wound Electric Double-Layer Capacitor]

The activated carbon electrodes and the separators were wound to obtain an electric double-layer capacitor element. The element was housed in a bottomed cylindrical aluminum case, an electrolyte solution in which tetraethylammonium tetrafluoroborate as an electrolyte was dissolved in a propylene carbonate solvent was dispensed into the case, and vacuum impregnation was performed. Thereafter, the case was sealed using a sealing rubber to produce an electric double-layer capacitor (10 mmφ×35 mmL) having a rated voltage of 2.5 V and a rated capacity of 10 F.
[Workability in Production of Element of Wound Electric Double-Layer Capacitor]

When 100 wound electric double-layer capacitor elements were produced, the number of occurrences of separator breakage was measured under the same production conditions, and the capacitor element whose number of occurrences was 1 or less was evaluated as ○, the capacitor element whose number of occurrences was 9 or less was evaluated as Δ, and the capacitor element whose number of occurrences was 10 or more was evaluated as X.

[Internal Resistance of Wound Electric Double-Layer Capacitor]

The internal resistance of the wound electric double-layer capacitor was measured using an alternating current (a.c.) resistance method of "4.6 Internal resistance" defined in "JIS C 5160-1 'Fixed electric double-layer capacitors for use in electronic equipment'".

[Leakage Current of Wound Electric Double-Layer Capacitor]

The leakage current of the wound electric double-layer capacitor was measured at a current application time of 30 minutes in accordance with "4.7 Leakage current" defined in "JIS C 5160-1 'Fixed electric double-layer capacitors for use in electronic equipment'".

[Percentage of Defective Products Due to Short Circuits of Wound Electric Double-Layer Capacitor]

For each of 100 wound electric double-layer capacitor samples, the percent defective was defined as the percent obtained by deeming a case where the charging voltage did not rise to the rated voltage as a defect due to short circuit, and dividing the number of defective products by 100.

Example 1

Lyocell fibers, which are regenerated cellulose fibers, having a fiber diameter of 14 μm were beaten to obtain a separator having a thickness of 25 μm, a basis weight of 10.5 g/m$^2$, and a density of 0.42 g/cm$^3$ using a Fourdrinier single-layer paper machine. The separator had a tensile strength of 9.8 N/15 mm, a modified tensile strength of 5.9 N/15 mm, an average pore diameter of 0.50 μm, and an average fiber diameter of 8.5 μm for main fibers having a fiber diameter of 3 μm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 μF, a diameter of 10 mm and a length of 10 mm. The workability at the time of producing the capacitor element was ○, the percent defective after aging was 0%, and the impedance was 0.113Ω.

Example 2

Lyocell fibers, which are regenerated cellulose fibers, having a fiber diameter of 18 μm were beaten and 3% of polyacrylamide-based resin in terms of a solid content was added as dry paper strength additive to Lyocell fibers to obtain a separator having a thickness of 10 μm, a basis weight of 5.0 g/m$^2$, and a density of 0.50 g/cm$^3$ using a Fourdrinier single-layer paper machine. The separator had a tensile strength of 10.0 N/15 mm, a modified tensile strength of 7.2 N/15 mm, an average pore diameter of 0.55 μm, and an average fiber diameter of 3.2 μm for main fibers having a fiber diameter of 3 μm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 μF, a diameter of 10 mm and a length of 10 mm. The workability at the time of producing the capacitor element was ○, the percent defective after aging was 2%, and the impedance was 0.096Ω.

Example 3

Lyocell fibers, which are regenerated cellulose fibers, having a fiber diameter of 4 μm were beaten, subjected to papermaking using a Fourdrinier single-layer paper machine, and dried. An aqueous solution of a polyacrylamide-based resin diluted to a solid content concentration of 1% was applied thereto as a dry paper strength additive, and then dried again to obtain a separator having a thickness of 35 μm, a basis weight of 12.3 g/m$^2$, and a density of 0.35 g/cm$^3$. The separator had a tensile strength of 12.7 N/15 mm, a modified tensile strength of 9.9 N/15 mm, an average pore diameter of 0.96 μm, and an average fiber diameter of 3.1 μm for main fibers having a fiber diameter of 3 μm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 μF, a diameter of 10 mm and a length of 10 mm. The workability at the time of producing the capacitor element was ○, the percent defective after aging was 3%, and the impedance was 0.120Ω.

Example 4

Lyocell fibers, which are regenerated cellulose fibers, having a fiber diameter of 16 μm were beaten and 0.5% of polyacrylamide-based resin in terms of a solid content was added as dry paper strength additive to Lyocell fibers. The obtained mixture was subjected to papermaking using a Fourdrinier single-layer paper machine, and then subjected to calendering to obtain a separator having a thickness of 12 μm, a basis weight of 9.0 g/m$^2$, and a density of 0.75 g/cm$^3$. The separator had a tensile strength of 13.7 N/15 mm, a modified tensile strength of 11.0 N/15 mm, an average pore diameter of 0.72 μm, and an average fiber diameter of 12.0 μm for main fibers having a fiber diameter of 3 μm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 μF, a diameter of 10 mm and a length of 10 mm. The workability at the time of producing the capacitor element was ○, the percent defective after aging was 1%, and the impedance was 0.109Ω.

Example 5

Lyocell fibers, which are regenerated cellulose fibers, having a fiber diameter of 8 μm were beaten and 2% of polyacrylamide-based resin in terms of a solid content was added as dry paper strength additive to Lyocell fibers to obtain a separator having a thickness of 30 μm, a basis weight of 13.5 g/m$^2$, and a density of 0.45 g/cm$^3$ using a Fourdrinier single-layer paper machine. The separator had a tensile strength of 19.3 N/15 mm, a modified tensile strength of 15.4 N/15 mm, an average pore diameter of 0.37 μm, and an average fiber diameter of 6.1 μm for main fibers having a fiber diameter of 3 μm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 µF, a diameter of 10 mm and a length of 10 mm. The workability at the time of producing the capacitor element was ○, the percent defective after aging was 0%, and the impedance was 0.124Ω. In the case where the separator obtained in Example 5 was used, the line speed could be improved by 40% as compared with the case where the separator of Conventional Example 1 to be described later was used.

Comparative Example 1

Lyocell fibers, which are regenerated cellulose fibers, having a fiber diameter of 20 µm were beaten to obtain a separator having a thickness of 25 µm, a basis weight of 10.5 g/m², and a density of 0.42 g/cm³ using a Fourdrinier single-layer paper machine. The separator had a tensile strength of 10.8 N/15 mm, a modified tensile strength of 5.4 N/15 mm, an average pore diameter of 0.77 µm, and an average fiber diameter of 12.5 µm for main fibers having a fiber diameter of 3 µm or more.

The separator slit to a width of 6 mm was used to produce a capacitor element, and the capacitor element was impregnated with a GBL-based electrolytic solution.

Thereafter, the impregnated capacitor element was inserted into a case, and the case was sealed to obtain an aluminum electrolytic capacitor having a rated voltage of 35 V, a capacity of 330 µF, a diameter of 10 mm and a length of 10 mm. The workability at the time of producing the capacitor element was Δ, the percent defective after aging was 4%, and the impedance was 0.118Ω.

Reference Example 1

Lyocell fibers, which are regenerated cellulose fibers, having a fiber diameter of 10 µm were beaten to obtain a separator having a thickness of 30 µm, a basis weight of 10.5 g/m², and a density of 0.35 g/cm³ using a Fourdrinier single-layer paper machine. The separator had a tensile strength of 9.5 N/15 mm, a modified tensile strength of 5.2 N/15 mm, an average pore diameter of 0.77 µm, and an average fiber diameter of 9.2 µm for main fibers having a fiber diameter of 3 µm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 µF, a diameter of 10 mm and a length of 10 mm. The workability at the time of producing the capacitor element was Δ, the percent defective after aging was 11%, and the impedance was 0.117Ω.

Conventional Example 1

Lyocell fibers, which are regenerated cellulose fibers, having a fiber diameter of 10 µm were beaten to obtain a separator having a thickness of 20 µm, a basis weight of 9.0 g/m², and a density of 0.45 g/cm³ using a Fourdrinier single-layer paper machine. The separator had a tensile strength of 9.8 N/15 mm, a modified tensile strength of 5.0 N/15 mm, an average pore diameter of 0.59 µm, and an average fiber diameter of 7.3 µm for main fibers having a fiber diameter of 3 µm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 µF, a diameter of 10 mm and a length of 10 mm. The workability at the time of producing the capacitor element was X, the percent defective after aging was 5%, and the impedance was 0.109Ω.

Conventional Example 2

Lyocell fibers, which are regenerated cellulose fibers, having a fiber diameter of 14 µm were beaten to obtain a separator having a thickness of 35 µm, a basis weight of 14.0 g/m², and a density of 0.40 g/cm³ by using a cylinder three-layer paper machine. The separator had a tensile strength of 9.8 N/15 mm, a modified tensile strength of 6.9 N/15 mm, an average pore diameter of 1.13 µm, and an average fiber diameter of 11.1 µm for main fibers having a fiber diameter of 3 µm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 µF, a diameter of 10 mm and a length of 10 mm. The workability at the time of producing the capacitor element was ○, the percent defective after aging was 22%, and the impedance was 0.127Ω.

Conventional Example 3

A raw material obtained by mixing 40 mass % of hardwood kraft pulp, 10 mass % of sisal hemp pulp, and 50 mass % of a raw material obtained by beating lyocell fibers having a fiber diameter of 14 µm was subjected to papermaking using a Fourdrinier single-layer paper machine to obtain a separator having a thickness of 30 µm, a basis weight of 15.0 g/m², and a density of 0.50 g/cm³. The separator had a tensile strength of 11.8 N/15 mm, a modified tensile strength of 7.6 N/15 mm, an average pore diameter of 0.81 µm, and an average fiber diameter of 15.6 µm for main fibers having a fiber diameter of 3 µm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 µF, a diameter of 10 mm and a length of 10 mm. The workability at the time of producing the capacitor element was ○, the percent defective after aging was 0%, and the impedance was 0.137Ω.

Conventional Example 4

By mixing 50 mass % of a raw material obtained by beating Lyocell fibers having a fiber diameter of 14 µm and 50 mass % of a raw material obtained by more highly beating lyocell fibers having a fiber diameter of 14 µm, a separator having a thickness of 20 µm, a basis weight of 9.0 g/m², and a density of 0.45 g/cm³ was obtained using a Fourdrinier single-layer paper machine. The separator had a tensile strength of 9.8 N/15 mm, a modified tensile strength of 4.9 N/15 mm, an average pore diameter of 0.48 µm, and an average fiber diameter of 5.3 µm for main fibers having a fiber diameter of 3 µm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 35 V, a capacity of 330 µF, a diameter of 10 mm and a length of 10 mm. The workability at the time of producing the capacitor element was X, the percent defective after aging was 7%, and the impedance was 0.107Ω.

Table 1 provides the evaluation results of each of single separators and the evaluation results of the aluminum electrolytic capacitors having a rated voltage of 35 V of Examples 1 to 5 according to the embodiment, Comparative Example 1, Reference Example 1, and Conventional Examples 1 to 4, all of which have been described above.

fibers in the separator is small. Therefore, the modified tensile strength decreased, and the workability at the time of producing the capacitor element deteriorated. In addition, in the separator of Comparative Example 1, since the average fiber diameter of the main fibers was large, the denseness decreased, the value of the average pore diameter increased, and the percent defective of the aluminum electrolytic capacitor after aging deteriorated as compared with the separator of Example 1.

In the separator of Reference Example 1, the fiber diameter of the regenerated cellulose fibers before beating is 10 µm, the average fiber diameter of the main fibers having a fiber diameter of 3 µm or more of the separator is 9.2 µm, the difference is 0.8 µm, and the reduction rate represented by [(Fiber diameter of regenerated cellulose fibers before beating−Average fiber diameter of main fibers having fiber diameter of 3 µm or more of separator)/Fiber diameter of regenerated cellulose fibers before beating] was as small as 8.0%. Therefore, in the separator of Reference Example 1,

TABLE 1

| | | Separator | | | | | | | Aluminum electrolytic capacitor | | |
|---|---|---|---|---|---|---|---|---|---|---|---|
| | | Thickness µm | Basis weight g/m³ | Density g/cm³ | Tensile strength N/15 mm | Modified tensile strength N/15 mm | Average pore diameter µm | Average fiber diameter µm | Workability at time of producing element | Percent defective % | Impedance Ω/100 kHz |
| Example1 | Fourdrinier single layer | 25 | 10.5 | 0.42 | 9.8 | 5.9 | 0.50 | 8.5 | ○ | 0 | 0.113 |
| Example2 | Fourdrinier single layer | 10 | 5.0 | 0.50 | 10.0 | 7.2 | 0.55 | 3.2 | ○ | 2 | 0.096 |
| Example3 | Fourdrinier single layer | 35 | 12.3 | 0.35 | 12.7 | 9.9 | 0.96 | 3.1 | ○ | 3 | 0.120 |
| Example4 | Fourdrinier single layer | 12 | 9.0 | 0.75 | 13.7 | 11.0 | 0.72 | 12.0 | ○ | 1 | 0.109 |
| Example5 | Fourdrinier single layer | 30 | 13.5 | 0.45 | 19.3 | 15.4 | 0.37 | 6.1 | ○ | 0 | 0.124 |
| Comparative Example1 | Fourdrinier single layer | 25 | 10.5 | 0.42 | 10.8 | 5.4 | 0.77 | 12.5 | Δ | 4 | 0.118 |
| Reference Example1 | Fourdrinier single layer | 30 | 10.5 | 0.35 | 9.5 | 5.2 | 1.07 | 9.2 | Δ | 11 | 0.117 |
| Conventional Example1 | Fourdrinier single layer | 20 | 9.0 | 0.45 | 9.8 | 5.0 | 0.59 | 7.3 | x | 5 | 0.109 |
| Conventional Example2 | Cylinder three layer | 35 | 14.0 | 0.40 | 9.8 | 6.9 | 1.13 | 11.1 | ○ | 22 | 0.127 |
| Conventional Example3 | Fourdrinier single layer | 30 | 15.0 | 0.50 | 11.8 | 7.6 | 0.81 | 15.6 | ○ | 0 | 0.137 |
| Conventional Example4 | Fourdrinier single layer | 20 | 9.0 | 0.45 | 9.8 | 4.9 | 0.48 | 5.3 | x | 7 | 0.107 |

The separators of Examples 1 to 5 had a thickness of from 10 to 35 µm, a density of from 0.35 to 0.80 g/cm³, a tensile strength of 9.8 N/15 mm or more, an average pore diameter of from 0.05 to 1.00 µm, and a modified tensile strength of 5.9 N/15 mm or more. This allowed the separators of Examples 1 to 5 to have both denseness and low impedance characteristics and have high resistance to a rapid tension change. As a result, the workability at the time of producing the element of the aluminum electrolytic capacitor was good, and the percent defective after aging was small.

The aluminum electrolytic capacitors produced using the separators of Examples 1 to 5 worked without problems.

The separator of Comparative Example 1 has the average fiber diameter of main fibers having a fiber diameter of 3 µm or more is as thick as 12.5 µm. The separator of Comparative Example 1 has the same thickness and density as the separator of Example 1, but the average fiber diameter of the main fibers is large, and the number of overlapping main fibrillation of regenerated cellulose fibers was insufficient, the modified tensile strength decreased, and the average pore diameter increased.

The separator of Conventional Example 1 was produced using the technique disclosed in Patent Literature 8. The separator of Conventional Example 1 was formed of beaten regenerated cellulose fibers, and had a thickness of from 10 to 35 µm, a density of from 0.35 to 0.80 g/cm³, a tensile strength of 9.8 N/15 mm or more, and an average pore diameter of from 0.05 to 1.00 µm, but the modified tensile strength was only 5.0 N/15 mm. As a result, the separator could not withstand a rapid tension change at the time of winding the element and was sometimes broken. In addition, the separator was also broken when the separator was pulled out from a jig temporarily pressing the separator at the time of producing the element. Furthermore, since the separator of Conventional Example 1 had a small value of the modified tensile strength, the resistance to a place to which stress was applied was low as compared with the separators of Examples 1 to 5. As a result, the separator was broken at the tab portion of the capacitor to cause a short circuit.

The separator of Conventional Example 2 was produced using the technique disclosed in Patent Literature 5. Since the separator of Conventional Example 2 had a modified tensile strength of 6.9 N/15 mm, there was no problem in workability at the time of producing a capacitor element. However, since the separator was manufactured by using a cylinder paper machine, generation of pinholes could not be avoided even in the case of three-layer paper when the thickness was 35 µm or less. In the separator of Conventional Example 2, as a result of reduced denseness, the average pore diameter increased to 1.13 µm, and the percent defective after aging was high as compared with the separators of Examples 1 to 5.

The separator of Conventional Example 3 was produced using the technique disclosed in Patent Literature 3. Since natural cellulose fibers are larger in fiber diameter than fibrils of regenerated cellulose fibers, it was reconfirmed that deterioration of denseness and impedance characteristics cannot be avoided when natural cellulose fibers are mixed with regenerated cellulose fibers. In particular, when both denseness and low impedance characteristics are strongly required as in an aluminum electrolytic capacitor for in-vehicle applications with a thickness of 35 µm or less, it is difficult to use natural cellulose fibers.

The separator of Conventional Example 4 was produced using the technique disclosed in Patent Literature 7. Since the separator of Conventional Example 4 had strong tear strength, breakage did not occur in a process in which torsion or the like occurs at the time of producing the capacitor element. However, in the separator of Conventional Example 4, since the value of the modified tensile strength was small, the separator could not withstand a rapid tension change at the time of winding the element and was sometimes broken. In addition, the separator was also broken when the separator was pulled out from a jig temporarily pressing the separator at the time of producing the element.

Example 6

Lyocell fibers, which are regenerated cellulose fibers, having a fiber diameter of 10 µm were beaten and subjected to papermaking using a Fourdrinier single-layer paper machine. Thereafter, the obtained product was subjected to calendering to obtain a separator having a thickness of 30 µm, a basis weight of 19.5 g/m$^2$, and a density of 0.65 g/cm$^3$. The separator had a tensile strength of 16.7 N/15 mm, a modified tensile strength of 10.0 N/15 mm, an average pore diameter of 0.12 µm, and an average fiber diameter of 4.5 µm for main fibers having a fiber diameter of 3 µm or more.

The separator slit to a width of 6 mm was used to produce a capacitor element, and the capacitor element was impregnated with a GBL-based electrolytic solution. Thereafter, the impregnated capacitor element was inserted into a case, and the case was sealed to obtain an aluminum electrolytic capacitor having a rated voltage of 160 V, a capacity of 47 µF, a diameter of 10 mm and a length of 10 mm. The workability at the time of producing the capacitor element was ○, and the percent defective after aging was 0%. It was confirmed that the separator of Example 6 can be used at a rated voltage of 160 V in an intermediate pressure range.

Next, 100 wound electric double-layer capacitors were produced using the separators obtained in Example 5 and Conventional Example 1, and the internal resistance, leakage current, and percentage of defective products due to short circuits were measured.

In the wound electric double-layer capacitor using the separator of Conventional Example 1, the workability at the time of production was X, the internal resistance was 80 mΩ, the leakage current was 380 µA, and the percent defective was 3%.

On the other hand, in the wound electric double-layer capacitor using the separator obtained in Example 5, the workability at the time of production was ○, the internal resistance was 92 mΩ, the leakage current was 343 µA, and the percent defective was 0%. As a result, the effects of productivity improvement and leakage current reduction due to workability improvement could be confirmed. Moreover, in the case where the separator obtained in Example 5 was used, the winding speed could be improved by 20% as compared with the case where the separator of Conventional Example 1 was used.

Next, a stacked electric double-layer capacitor was produced using the separator of Example 5.

The activated carbon electrodes and the separators were alternately folded to obtain an electric double-layer capacitor element. The element was housed in an aluminum case, and an electrolyte solution in which triethylmethylammonium hexafluorophosphate was dissolved in acetonitrile was dispensed into the case, and vacuum impregnation was performed. Thereafter, the case was sealed to produce an electric double-layer capacitor.

The produced stacked electric double-layer capacitor worked without problems.

Next, a lithium-ion capacitor was produced using the separator of Example 5.

An activated carbon electrode for a lithium-ion capacitor was used as a positive electrode material, and a graphite electrode was used as a negative electrode material. The separator and the electrode material were alternately folded to obtain a lithium-ion capacitor element. The element was housed in a multilayer laminated film together with foil for lithium pre-doping, an electrolyte solution was dispensed thereinto and vacuum impregnation was performed. Thereafter, the laminate film was sealed to produce a lithium-ion capacitor. As the electrolyte solution, a solution obtained by dissolving lithium hexafluorophosphate as an electrolyte in a propylene carbonate solvent was used.

The produced lithium-ion capacitor worked without problems.

Next, a lithium-ion secondary battery was produced using the separator of Example 5.

A lithium cobalt oxide electrode for a lithium-ion secondary battery was used as a positive electrode material and a graphite electrode was used as a negative electrode material. These electrodes were wound together with a separator to obtain a lithium-ion secondary battery element. The element was housed in a bottomed cylindrical case, an electrolyte solution in which tetraethylammonium tetrafluoroborate as an electrolyte was dissolved in a propylene carbonate solvent was dispensed into the case. The case was sealed using a press machine to produce a lithium-ion secondary battery.

The produced lithium-ion secondary battery worked without problems.

Next, a lithium primary battery was produced using the separator of Example 5.

A positive electrode mixture was obtained by compacting a mixture obtained by mixing a conductive agent such as carbon powder and a binder such as fluororesin with heattreated manganese dioxide into a hollow cylindrical shape. The positive electrode mixture was disposed in close contact with an inner peripheral surface of a battery case, and a separator formed in a cylindrical shape was disposed in close contact with a hollow inner surface of the positive electrode mixture. An electrolyte solution in which $LiClO_4$ was dissolved in a mixed solution of propylene carbonate and 1,2-dimethoxyethane in a ratio of 1:1 (weight ratio), and the separator was impregnated with the electrolyte solution until the separator was sufficiently wetted. A negative electrode member obtained by cutting sheet-shaped metal lithium into a predetermined size was wound around the inner peripheral surface of the separator and disposed in close contact with the separator. Furthermore, sealing was performed by crimping with a gasket interposed between the battery case members. In this manner, a cylindrical lithium primary battery was produced.

The produced lithium primary battery worked without problems.

As a result, the configuration of the separator derived from examples of the present invention is a separator for electrochemical elements, which is formed of beaten regenerated cellulose fibers, is a single-layer separator, and has a thickness of from 10 to 35 μm, a density of from 0.35 to 0.80 g/cm$^3$, a tensile strength of from 9.8 N/15 mm or more, an average pore diameter of from 0.05 to 1.00 μm, and a modified tensile strength of 5.9 N/15 mm or more. Employing this configuration makes it possible to provide a separator for electrochemical elements, which is formed of beaten regenerated cellulose fibers and is capable of withstanding a common element winding process for an aluminum electrolytic capacitor, while having both denseness and low impedance characteristics. In addition, by using this separator, it is possible to provide an electrochemical element in which productivity is improved and the percentage of defective products due to short circuits is improved.

The separator for electrochemical elements according to the present invention is applicable to various electrochemical elements including an aluminum electrolytic capacitor, an electric double-layer capacitor, a lithium-ion capacitor, a lithium-ion secondary battery, and a lithium primary battery.

The invention claimed is:

1. A separator for electrochemical elements, the separator being interposed between a pair of electrodes, the separator being formed of regenerated cellulose fibers that are beaten, the separator configured to hold an electrolyte solution that contains an electrolyte, wherein the separator is a single-layer separator, the separator has a thickness of from 10 to 35 μm, a density of from 0.35 to 0.80 g/cm$^3$, a tensile strength of 9.8 N/15 mm or more, and an average pore diameter of from 0.05 to 1.00 μm, and when a value of a tensile strength as measured by setting a distance between holders of a tensile testing machine to 0.1 mm and an elongation rate of a test piece to 200 mm/min is defined as a modified tensile strength, the separator has the modified tensile strength of 5.9 N/15 mm or more.

2. The separator for electrochemical elements according to claim 1, wherein the regenerated cellulose fibers include fibril portions having a fiber diameter of less than 3 μm, and main fibers having a fiber diameter of 3 μm or more, and an average fiber diameter of the main fibers is from 3 to 12 μm.

3. An electrochemical element comprising the separator for electrochemical elements according to claim 2.

4. The electrochemical element according to claim 3, wherein the electrochemical element is any of an aluminum electrolytic capacitor, an electric double-layer capacitor, a lithium-ion capacitor, a lithium-ion secondary battery, and a lithium primary battery.

5. An electrochemical element comprising the separator for electrochemical elements according to claim 1.

6. The electrochemical element according to claim 5, wherein the electrochemical element is any of an aluminum electrolytic capacitor, an electric double-layer capacitor, a lithium-ion capacitor, a lithium-ion secondary battery, and a lithium primary battery.

* * * * *